April 4, 1961    A. E. GOMSI    2,978,356
LAMINATED STRUCTURE AND PROCESS FOR PREPARING SAME
Filed March 18, 1958

INVENTOR.
ARNE E. GOMSI
BY
ATTORNEY

United States Patent Office 2,978,356
Patented Apr. 4, 1961

2,978,356
LAMINATED STRUCTURE AND PROCESS FOR PREPARING SAME

Arne E. Gomsi, Vestal, N.Y., assignor to General Aniline & Film Corporation, New York, N.Y., a corporation of Delaware Filed Mar. 18, 1958, Ser. No. 722,252

4 Claims. (Cl. 117—62)

This invention relates to a laminated structure comprising a number of superposed layers, one of which is a metal, and to a process for producing said structure. More particularly, this invention relates to a casting band made of stainless steel and having a casting surface of saponified cellulose ester firmly united with said steel band.

Heretofore, film casting bands have been made mostly of copper, covered with a layer of cellulose ester having a surface layer of saponified cellulose ester thereon. The cellulose ester layer is anchored to the copper band by an adhesive layer comprising cellulose nitrate.

Copper film casting bands have many disadvantages, one of which is their tendency to be easily strained thereby causing streaks and other defects in the film cast thereon. Stainless steel bands do not suffer from this disadvantage. However, they could not be used heretofore because no material was known which would anchor the cellulose ester layer to the stainless steel sufficiently firmly to serve as a film casting surface.

I have found that copolymers of a lower alkylvinyl ether and maleic anhydride firmly bond to stainless steel and other metals and to organic plastics such as cellulose acetate and polyvinyl alcohol.

It is, therefore, an object of this invention to provide a film casting band comprising a stainless steel band having a saponified cellulose ester casting surface firmly anchored thereto.

A further object of this invention is to provide a structure formed of two or more layers of different plastic materials firmly united together and bonded to a metal by a copolymer of a lower alkylvinyl ether and maleic anhydride.

Other objects and advantages of this invention will appear from the following detailed description.

Figure 1:
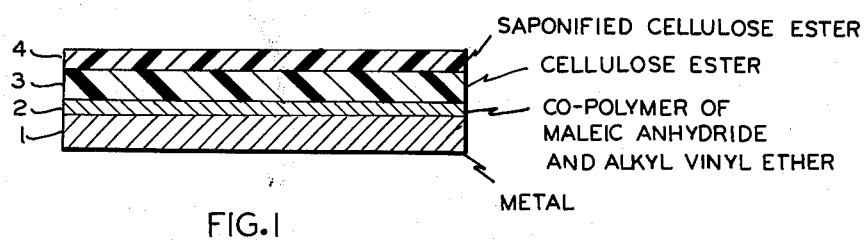
Figure 2:
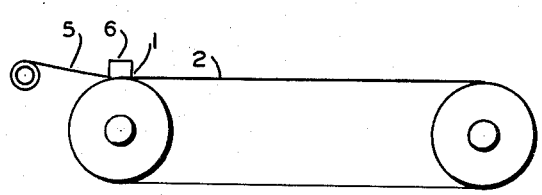

The invention is further illustrated by the accompanying drawing in which Fig. 1 is a transverse cross section of a film casting band made according to this invention showing the various layers making up the improved band; Fig. 2 is a diagrammatic side view of an apparatus which may be used in the process of forming the film casting band of this invention.

The casting band of my invention as shown in Fig. 1 of the drawing comprises a steel band 1, an adhesive layer 2 of a copolymer of a low alkylvinyl ether and maleic anhydride such as the copolymer of methylvinyl ether and maleic anhydride, a layer 3 of cellulose ester, such as cellulose acetate, and a layer 4 of a saponified cellulose ester, such as saponified cellulose acetate.

In Fig. 2 of the drawing, I have shown diagrammatically an apparatus for applying the adhesive layer 2 to the stainless steel band 1. A piece of flannel cloth 5 is positioned at an angle to the steel band with one end of the cloth supported above the band 1 and the other end of the cloth resting on the band and kept in place by a flat piece of iron 6.

A solution of the copolymer of vinyl methyl ether and maleic anhydride (commonly known as PVM/MA) in acetone was poured onto the flannel cloth 5 in the direction of the arrow. The piece of iron 6 served to meter the solution. The other layers were then placed on the adhesive layer by conventional techniques. The copolymer of vinyl methyl ether and maleic anhydride (PVM/MA) is prepared from substantially equimolar proportions of the two intermediates substantially as described in U.S. Patent 2,047,398, granted July 14, 1936. This copolymer is also available on the open market.

In one of these conventional techniques, a layer of cellulose ester such as cellulose acetate is spread on the adhesive layer and then a solution containing a de-esterifying reagent such as an alkali metal hydroxide is spread on the exposed surface of the cellulose acetate. The hydroxide de-esterifies the ester and forms a layer or surface of saponified cellulose ester of any desired thickness on the ester layer.

The concentration of PVM/MA in the solution may be varied over a wide range. I have used concentrations varying from 2.0 grams to 9.1 grams of the solid per 100 grams of solution with good results. Higher concentrations may be used with suitable techniques of application. An example of a suitable solution is 9.1 grams of the resin in 90.9 grams of acetone. This solution has a viscosity of 3.1 centipoises at 25° C.

The type of cellulose acetate used to form the band may also be varied. I have used cellulose acetate of 44% to 47% combined acetic acid and cellulose acetate of 52% to 61.8% combined acetic acid with equally good results.

The copolymer of vinyl methyl ether and maleic anhydride may be used as a bonding layer for other resins, such as methyl cellulose, sodium carboxymethyl cellulose, hydroxyethyl cellulose, etc. to form the adhesive layer on the metal.

While we have described the use of the copolymer of vinyl methyl ether and maleic anhydride as an adhesive for stainless steel, it is not limited in its use to this particular metal but forms an excellent adhesive for other metals. There are numerous advantages in using this particular resin as an adhesive for adhering other materials especially thermoplastic materials to metals. For example, no catalysts or special curing procedures are required for this resin after it is applied to the metal. Several minutes of drying at room temperature are sufficient to form an adhesive layer on the metal to which layers of other materials, such as cellulose acetate or vinyl alcohol will adhere. The dry cellulose acetate layer can be easily removed from the metal surface by overcoating with a softening layer of cellulose ester dope, as for example, a solution of cellulose acetate in acetone and peeling it away before it is completely dry. Any residual PVM/MA adhering to the metal can be removed by a treatment with either water or acetone.

In view of its excellent adhesiveness to metals, the PVM/MA may also be used as a primer for adhering a coat of lacquer or paint to a metal surface.

In place of PVM/MA, copolymers of maleic anhydride with other lower alkylvinyl ethers, ethylvinyl ether, 2-chloroethylvinyl ether, isobutylvinyl ether, n-butylvinyl ether or 2-methoxyethyl vinyl ether may also be used as the adhesive layer.

The aforesaid copolymers may be made according to the method described in U.S. Patent 2,744,098, granted May 1, 1956. Typically, a benzene solution of the selected vinyl ether is slowly added to a refluxing benzene solution containing an equivalent weight of maleic anhydride and about 1% of lauroyl peroxide based on the weight of the maleic anhydride. Heating of the reaction mixture is continued for two hours, after which the benzene is removed by filtration and the precipitated copolymer vacuum-dried at 45° C. The product is obtained in the form of a free flowing white powder and in yields varying from 83% of theory to quantitative.

Modifications of the invention will occur to persons skilled in the art. I, therefore, do not intend to be limited to the patent granted except as necessitated by the appended claims.

I claim:

1. A laminated film casting band for use in casting films comprising in that order, a stainless steel casting band, a bonding layer consisting of the copolymer of maleic anhydride with a lower alkylvinyl ether and a cellulose ester layer having a saponified and de-esterified outer surface, said copolymer layer being bonded directly to said stainless steel band and to said cellulose ester layer.

2. A casting band as recited in claim 1 wherein the cellulose ester is cellulose acetate and the copolymer of maleic anhydride and a lower alkylvinyl ether is the copolymer of maleic anhydride and methylvinyl ether.

3. A process of forming a casting band suitable for casting film thereon which comprises coating a stainless steel casting band with a solution of the copolymer of a lower alkylvinyl ether with maleic anhydride, partially drying the thus coated copolymer layer at room temperature, casting a layer of cellulose ester on said copolymer layer and saponifying the exposed surface of the cellulose ester layer to form a de-esterified outer surface.

4. A process as recited in claim 3 wherein the cellulose ester is cellulose acetate and the copolymer of the lower alkylvinyl ether and maleic anhydride is the copolymer of methylvinyl ether and maleic anhydride.

References Cited in the file of this patent

UNITED STATES PATENTS

| | | |
|---|---|---|
| 1,988,550 | Gladhorn et al. | Jan. 22, 1935 |
| 2,205,466 | Caprio et al. | June 25, 1940 |
| 2,280,055 | Andersen | Apr. 21, 1942 |
| 2,423,503 | Land et al. | July 8, 1947 |
| 2,744,098 | Towne | May 1, 1956 |
| 2,756,163 | Herrick et al. | July 24, 1956 |